United States Patent
Kataoka et al.

(10) Patent No.: US 7,235,596 B2
(45) Date of Patent: Jun. 26, 2007

(54) FLAME-RESISTANT FIBER AND FIBER MOLDING USING THE SAME

(75) Inventors: Yukinori Kataoka, Moriyama (JP); Masaru Andoh, Moriyama (JP); Kyuzo Namura, Moriyama (JP)

(73) Assignees: Chisso Polypro Fiber Company Limited., Tokyo (JP); Chisso Corporation, Osaka (JP)

( * ) Notice: Subject to any disclaimer, the term of this patent is extended or adjusted under 35 U.S.C. 154(b) by 443 days.

(21) Appl. No.: 10/828,106

(22) Filed: Apr. 19, 2004

(65) Prior Publication Data

US 2004/0225041 A1    Nov. 11, 2004

(30) Foreign Application Priority Data

Apr. 25, 2003   (JP) ............................. 2003-122094

(51) Int. Cl.
*C08K 5/3437* (2006.01)
(52) U.S. Cl. ..................... 524/100; 524/99; 524/116; 524/122; 524/138
(58) Field of Classification Search .......... 524/99–100, 524/116, 122, 138
See application file for complete search history.

(56) References Cited

U.S. PATENT DOCUMENTS 5,593,525 A * 1/1997 Isoda et al. ................ 156/62.2
6,486,238 B1 * 11/2002 Kitamura et al. ........... 524/100
6,657,033 B1 * 12/2003 Sartori et al. ............. 526/348.1
2002/0015847 A1   2/2002 Shimizu et al. ............. 428/375
2003/0220422 A1 * 11/2003 Kaprinidis ................... 524/86

FOREIGN PATENT DOCUMENTS

| JP | 2001-192392 | 7/2001 |
| JP | 2001-254225 | 9/2001 |
| JP | 2002-115118 | 4/2002 |
| WO | WO 99/00450 | 1/1999 |

* cited by examiner

*Primary Examiner*—Peter Szekely
(74) *Attorney, Agent, or Firm*—J.C. Patents

(57) ABSTRACT

The object of the present invention is to provide a flame-resistant fiber which possesses low negative effects on the environment and humans, such as emission of hazardous substances, which displays excellent both flame and weather resistance, and which does not reduce spinnability and fiber strength, and is able to provide a fiber molding obtained from the fiber. A flame-resistant fiber comprising at least one type of phosphazene derivatives selected from cyclic phosphazene derivatives and linear phosphazene derivatives, a hindered amine derivative containing specific groups, and a thermoplastic resin, wherein the fiber contains 0.25-5.0 wt % of the phosphazene derivative and 0.025-3.0 wt % of the hindered amine derivative, and the fiber fineness is 0.01-100 dtex.

4 Claims, No Drawings

FLAME-RESISTANT FIBER AND FIBER MOLDING USING THE SAME

CROSS-REFERENCE TO RELATED APPLICATION

This application claims the priority benefit of Japanese application serial no. 2003-122094, filed on Apr. 25, 2003.

BACKGROUND OF THE INVENTION

1. Field of the Invention

The present invention relates to a flame-resistant fiber possessing excellent flame resistance and weather resistance, and a fiber molding using the same.

2. Description of the Related Art

Demand exists today for imparting flame resistance to a variety of fiber products with respect to fire prevention and safety. Fibers comprising thermoplastic resins and fiber moldings containing these fibers (hereafter referred to as 'fiber materials'), such as nonwoven fabrics, are not exceptions. In particular, for the majority of fiber materials used in automobile interiors, interior housing materials, filters etc., flame resistance is imparted by a number of methods, such as compounding with flame-retardants and treating the fiber surface with flame-retardants. Examples of flame-retardants include halogenated compounds, heavy metal compounds, metal hydroxides, and phosphorus compounds, which may be used individually or as a mixture of two or more compounds.

Of the different flame-retardants, chlorine- or bromine-based halogen compounds and combinations of halogen compounds with antimony oxide are widely used. In particular, flame retardant compositions comprising bromine-based halogen compounds and antimony trioxide are widely used in a range of applications due to their excellent flame resistance. However, in recent years as public concerns regarding environmental issues have grown, halogen compounds have been regarded as a problem due to their release of hazardous gases (hydrogen halides) on combustion and their potential as a source of dioxins. In addition, heavy metal compounds, such as antimony oxide, have been indicated as possible carcinogenic substances. Therefore, their use in places with proximity to humans is inadvisable from a public health standpoint.

Furthermore, for fibers used in automobile interiors, interior housing materials, filters, etc., a decrease in physical strength caused by heat or UV degradation must be prevented because fibers in these applications are likely to be used over long time-spans. The compounding of weatherproofing agents into the fibers is a common method of preventing degradation. However, since the above-described halogen compounds and antimony oxide release acid components that deactivate weather-proofing agents, weather resistance of fibers containing the above-described flame-retardant compositions cannot be improved and, therefore, the fibers do not exhibit durability over long-term use. For this reason, flame-retardants that do not inhibit weather resistance, do not contain heavy metals, or do not release hazardous substances on combustion or processing are highly sought-after.

A number of flame-retardants other than halogen compounds and antimony oxide have been studied to solve the above-described problems, but an agent displaying good flame resistance equivalent to the halogen compounds and antimony oxide has not been found to date. Metal hydroxides and phosphorus compounds can also be used as a flame-retardant, but the amount required to impart the desired flame resistance to the fiber materials tends to be significantly higher than that of the above-described flame-retardants. In the manufacture of fiber materials by the spinning of thermoplastic resin compositions containing flame-retardants, increased amounts of added flame-retardants not only cause a decrease in the mechanical strength of the obtained fiber materials but also raise difficulties in the manufacturing process itself. Additionally economical problems also arise.

The use of hindered amine derivatives with specific structures as a flame-retardant which do not release hazardous substances in combustion or processing is disclosed, for example, in the patent references 1 to 4 below. However, the same problems as those described above exist because the hindered amine derivatives described in those patents display inferior flame resistance to the above-described flame-retardant compositions.

In other patents, for example, patent references 3 and 4 below using the hindered amine derivatives together with phosphorus compounds, such as aryl phosphite, are disclosed. However, similar to the flame-retardants described above, their flame resistance is insufficient. In addition, when a significant amount of aryl phosphite is used to increase flame resistance, various other problems arise, such as poor strength of the fiber materials, decrease in drawability as a result of the low boiling point aryl phosphite volatilizing at the spinning temperature, and deteriorating product quality and flame resistance due to the likelihood of aryl phosphite bleeding from the obtained fiber materials.

Further, phosphoric acid esters, such as aryl phosphite, are likely to contain residual catalysts used in the manufacture of the esters. Thus, when phosphoric acid esters are used in manufacturing fiber materials from polyolefins, the residual catalyst accelerates polyolefin degradation, resulting in a decrease in strength of the fiber materials. In addition, the characteristic odor of phosphoric acid esters not only deteriorates the working environment in which the fiber materials themselves are manufactured but also permeates into the manufactured fiber materials.

Use of specific cyclic phosphazenes as a flame-retardant is disclosed, for example, in the patent reference 5 below. The cyclic phosphazenes are easy to handle, do not cause environmental problems, and have excellent thermal stability and resistance to hydrolysis. However, using cyclic phosphazenes in isolation again has the same problem as described above due to their lower flame resistance when compared to the above-described flame-retardant compositions. Therefore, cyclic phosphazenes need to be compounded at a level in excess of 10 wt % to obtain sufficient flame resistance. Uses of thermoplastic resin compositions containing significant amounts of flame-retardants are limited to products that are thermal compression molded, and the molding of very fine products such as fiber materials from these compositions is difficult. Immersing the fiber materials into a solution containing cyclic phosphazenes is an alternative way to impart flame resistance. Nevertheless, the method only allows the cyclic phosphazenes to adhere to the surface of the fiber materials and, thus, the cyclic phosphazenes are released from the fiber materials following post-processing, post-treating, and long-term use, resulting in extremely low retention of flame-resistant properties.

Reference 1: WO 99/00450
Reference 2: JP 2001-254225A
Reference 3: JP 2002-115118A
Reference 4: US 2002/0015847A1
Reference 5: JP 2001-192392A

SUMMARY OF THE INVENTION

The objective of the present invention is to provide a flame-resistant fiber which possesses extremely low negative effects on the environment and humans, such as emission of hazardous substances, exhibits excellent both flame resistance and weather resistance, and which does not decrease spinnability and fiber strength, and to provide a fiber molding obtained from the fiber.

The present inventors have conducted comprehensive research in an effort to solve the above-described problems and, as a result, have found that the objectives are achieved by obtaining fibers with specific fineness through the compounding of hindered amine derivatives possessing specific structures with phosphazene compounds possessing specific structures to thermoplastic resins in specific ratios, thus leading to the establishment of the present invention.

The present invention provides the following.

(1) A flame-resistant fiber comprising at least one type of phosphazene derivative selected from cyclic phosphazene derivatives represented by the following general formula (I) and linear phosphazene derivatives represented by the following general formula (II), a hindered amine derivative containing groups represented by the general formula (III), and a thermoplastic resin, wherein the fiber contains 0.25-5.0 wt % of the phosphazene derivative and 0.025-3.0 wt % of the hindered amine derivative, and the fiber fineness is 0.01-100 dtex:

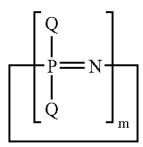
(I)

where m represents an integer from 3 to 10 and each of Qs represents a group independently selected from alkoxy, aryloxy, and amino:

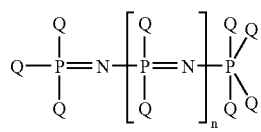
(II)

where n represents an integer from 3 to 10 and each of Qs represents a group independently selected from alkoxy, aryloxy, and amino:

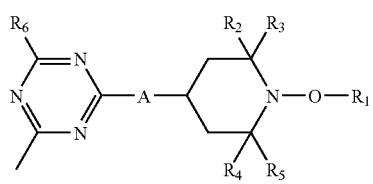
(III)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represents an alkyl group containing 1 to 4 carbon atoms or a pentamethylene group formed by linking $R_2$ and $R_3$ and/or $R_4$ and $R_5$; $R_6$ represents an alkoxy group containing 1 to 4 carbon atoms, an aryloxy group containing 6 to 12 carbon atoms, an amino group containing 1 to 18 carbon atoms, or a group represented by the general formula (IV) below; and A represents an oxygen atom or $NR_7$ where $R_7$ represents a hydrogen atom or a linear or branched alkyl group containing 1 to 12 carbon atoms:

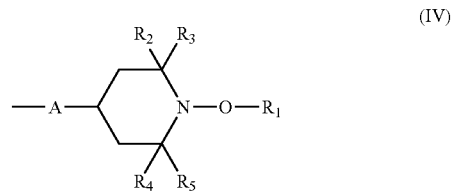
(IV)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represents an alkyl group containing 1 to 4 carbon atoms or a pentamethylene group formed by linking $R_2$ and $R_3$ and/or $R_4$ and $R_5$; and A represents an oxygen atom or $NR_7$ where $R_7$ represents a hydrogen atom or a linear or branched alkyl group containing 1 to 12 carbon atoms.

(2) A flame-resistant fiber according to (1), wherein the thermoplastic resin is selected from polyolefins and copolymers whose main components are olefins.

(3) A flame-resistant fiber according to (1) or (2), wherein the fiber is a composite fiber.

(4) A fiber molding using the fiber described in (1) to (3).

DESCRIPTION OF THE PREFERRED EMBODIMENTS

The flame-resistant fiber of the present invention is described in detail as follows. In the present invention a main component is defined as a component with the highest content.

A hindered amine derivative in a specific structure and a phosphazene derivative in a specific structure are compounded in specific ratios in the flame-resistant fiber of the present invention.

The phosphazene derivatives used for the flame-resistant fiber of the present invention are at least one type selected from cyclic phosphazene derivatives represented by the following general formula (I) and linear phosphazene derivatives represented by the following general formula (II):

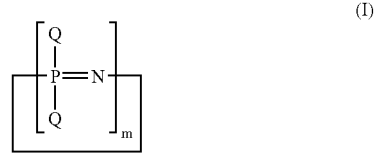
(I)

where m represents an integer from 3 to 10 and each of Qs represents a group independently selected from alkoxy, aryloxy, and amino:

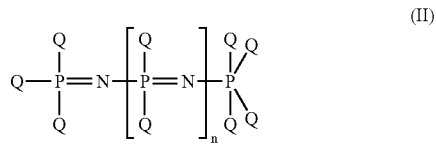

where n represents an integer from 3 to 10 and each of Qs represents a group independently selected from alkoxy, aryloxy, and amino.

No specific limitations are imposed on the phosphazene derivatives represented by the general formulas (I) and (II) as long as they are in the range of the definition described above. Preferred examples of the alkoxy, aryloxy, and amino groups as the substituent Q are as follows.

Preferred examples of the alkoxy groups described above include methoxy, ethoxy, n-propoxy, iso-propoxy, n-butoxy, and iso-butoxy. The number of carbon atoms in the group is preferably in the range of 1 to 8.

Preferred examples of the aryloxy groups described above include unsubstituted phenyloxy and phenyloxy substituted by methyl, ethyl, n-propyl, iso-propyl, tert-butyl, tert-octyl, methoxy, ethoxy, 2,3-dimethyl, 2,4-dimethyl, 2,5-dimethyl, 2,6-dimethyl, 3,5-dimethyl, or phenyl. In addition, the aryl of the aryloxy group may be naphthyl.

Preferred examples of the amino groups described above include $NH_2$, monoalkylamino having linear or branched chains, such as methylamino and ethylamino, and dialkylamino having linear or branched chains, such as dimethylamino and diethylamino.

The phosphazene derivatives for the flame resistant fiber of the present invention may contain byproducts with the halogen at the position of the substituent Q, compounds unreacted in the manufacturing processes. Thus, the total halogen content in the phosphazene derivatives is preferably 0.05 wt % or below because the present invention is aimed at providing flame-resistant fibers with extremely low emissions of hazardous gases.

Examples of the cyclic phosphazene derivatives represented by the general formula (I) for the flame-resistant fiber of the present invention include
1,1,3,3,5,5-hexa(methoxy)cyclotriphosphazene,
1,1,3,3,5,5-hexa(ethoxy)cyclotriphosphazene,
1,1,3,3,5,5-hexa(n-propoxy)cyclotriphosphazene,
1,1,3,3,5,5-hexa(iso-propoxy)cyclotriphosphazene,
1,1,3,3,5,5-hexa(n-butoxy)cyclotriphosphazene,
1,1,3,3,5,5-hexa(iso-butoxy)cyclotriphosphazene,
1,1,3,3,5,5-hexa(phenoxy)cyclotriphosphazene,
1,1,3,3,5,5-hexa(p-tolyloxy)cyclotriphosphazene,
1,1,3,3,5,5-hexa(m-tolyloxy)cyclotriphosphazene,
1,1,3,3,5,5-hexa(o-tolyloxy)cyclotriphosphazene,
1,1,3,3,5,5-hexa(p-anisyloxy)cyclotriphosphazene,
1,1,3,3,5,5-hexa(m-anisyloxy)cyclotriphosphazene,
1,1,3,3,5,5-hexa(o-anisyloxy)cyclotriphosphazene,
1,1,3,3,5,5-hexa(4-ethylphenoxy)cyclotriphosphazene,
1,1,3,3,5,5-hexa(4-n-propylphenoxy)cyclotriphosphazene,
1,1,3,3,5,5-hexa(4-iso-propylphenoxy)cyclotriphosphazene,
1,1,3,3,5,5-hexa(4-tert-butylphenoxy)cyclotriphosphazene,
1,1,3,3,5,5-hexa(4-tert-octylphenoxy)cyclotriphosphazene,
1,1,3,3,5,5-hexa(2,3-dimethylphenoxy)cyclotriphosphazene,
1,1,3,3,5,5-hexa(2,4-dimethylphenoxy)cyclotriphosphazene,
1,1,3,3,5,5-hexa(2,5-dimethylphenoxy)cyclotriphosphazene,
1,1,3,3,5,5-hexa(2,6-dimethylphenoxy)cyclotriphosphazene,
1,1,3,3,5,5-hexaaminocyclotriphosphazene,
1,1,3,3,5,5-hexa(4-phenylphenoxy)cyclotriphosphazene,
1,3,5-tris(methoxy)-1,3,5-tris(phenoxy)cyclotriphosphazene,
1,3,5-tris(ethoxy)-1,3,5-tris(phenoxy)cyclotriphosphazene,
1,3,5-tris(n-propoxy)-1,3,5-tris(phenoxy)cyclotriphosphazene,
1,3,5-tris(iso-propoxy)-1,3,5-tris(phenoxy)cyclotriphosphazene,
1,3,5-tris(n-butoxy)-1,3,5-tris(phenoxy)cyclotriphosphazene,
1,3,5-tris(iso-butoxy)-1,3,5-tris(phenoxy)cyclotriphosphazene,
1,3,5-tris(methoxy)-1,3,5-tris(p-tolyloxy)cyclotriphosphazene,
1,3,5-tris(methoxy)-1,3,5-tris(m-tolyloxy)cyclotriphosphazene,
1,3,5-tris(methoxy)-1,3,5-tris(o-tolyloxy)cyclotriphosphazene,
1,3,5-tris(methoxy)-1,3,5-tris(p-anisyloxy)cyclotriphosphazene,
1,3,5-tris(methoxy)-1,3,5-tris(m-anisyloxy)cyclotriphosphazene,
1,3,5-tris(methoxy)-1,3,5-tris(o-anisyloxy)cyclotriphosphazene,
1,3,5-tris(ethoxy)-1,3,5-tris(p-tolyloxy)cyclotriphosphazene,
1,3,5-tris(ethoxy)-1,3,5-tris(m-tolyloxy)cyclotriphosphazene,
1,3,5-tris(ethoxy)-1,3,5-tris(o-tolyloxy)cyclotriphosphazene,
1,3,5-tris(ethoxy)-1,3,5-tris(p-anisyloxy)cyclotriphosphazene,
1,3,5-tris(ethoxy)-1,3,5-tris(m-anisyloxy)cyclotriphosphazene,
1,3,5-tris(ethoxy)-1,3,5-tris(o-anisyloxy)cyclotriphosphazene,
1,3,5-tris(n-propoxy)-1,3,5-tris(p-tolyloxy)cyclotriphosphazene,
1,3,5-tris(n-propoxy)-1,3,5-tris(m-tolyloxy)cyclotriphosphazene,
1,3,5-tris(n-propoxy)-1,3,5-tris(o-tolyloxy)cyclotriphosphazene,
1,3,5-tris(n-propoxy)-1,3,5-tris(p-anisyloxy)cyclotriphosphazene,
1,3,5-tris(n-propoxy)-1,3,5-tris(m-anisyloxy)cyclotriphosphazene,
1,3,5-tris(n-propoxy)-1,3,5-tris(o-anisyloxy)cyclotriphosphazene,
1,3,5-tris(iso-propoxy)-1,3,5-tris(p-tolyloxy)cyclotriphosphazene,
1,3,5-tris(n-butoxy)-1,3,5-tris(p-tolyloxy)cyclotriphosphazene,
1,3,5-tris(iso-butoxy)-1,3,5-tris(p-tolyloxy)cyclotriphosphazene,
1,3,5-tris(methoxy)-1,3,5-tris(4-tert-butylphenoxy)cyclotriphosphazene,
1,3,5-tris(methoxy)-1,3,5-tris(4-tert-octylphenoxy)cyclotriphosphazene,
1,3,5-tris(n-propoxy)-1,3,5-tris(4-tert-butylphenoxy)cyclotriphosphazene, 1,3,5-tris(n-propoxy)-1,3,5-tris(4-tert-octylphenoxy)cyclotriphosphazene,
1,3,5-tris(methoxy)-1,3,5-tris(4-phenylphenoxy)cyclotriphosphazene,
1,3,5-tris(ethoxy)-1,3,5-tris(4-phenylphenoxy)cyclotriphosphazene,
1,3,5-tris(n-propoxy)-1,3,5-tris(4-phenylphenoxy)cyclotriphosphazene,
1,3,5-tris(iso-propoxy)-1,3,5-tris(4-phenylphenoxy)cyclotriphosphazene,
1,3,5-tris(n-butoxy)-1,3,5-tris(4-phenylphenoxy)cyclotriphosphazene,
1,3,5-tris(iso-butoxy)-1,3,5-tris(4-phenylphenoxy)cyclotriphosphazene,
1,1-diamino-3,3,5,5-tetrakis(methoxy)cyclotriphosphazene,
1,1-diamino-3,3,5,5-tetrakis(ethoxy)cyclotriphosphazene,
1,1-diamino-3,3,5,5-tetrakis(n-propoxy)cyclotriphosphazene,
1,1-diamino-3,3,5,5-tetrakis(iso-propoxy)cyclotriphosphazene,
1,1-diamino-3,3,5,5-tetrakis(n-butoxy)cyclotriphosphazene,
1,1-diamino-3,3,5,5-tetrakis(iso-butoxy)cyclotriphosphazene,
1,1-diamino-3,3,5,5-tetrakis(phenoxy)cyclotriphosphazene,
1,1-diamino-3,3,5,5-tetrakis(p-tolyloxy)cyclotriphosphazene,
1,1-diamino-3,3,5,5-tetrakis(m-tolyloxy)cyclotriphosphazene,
1,1-diamino-3,3,5,5-tetrakis(o-tolyloxy)cyclotriphosphazene,
1,1-diamino-3,3,5,5-tetrakis(p-anisyloxy)cyclotriphosphazene,
1,1-diamino-3,3,5,5-tetrakis(m-anisyloxy)cyclotriphosphazene,
1,1-diamino-3,3,5,5-tetrakis(o-anisyloxy)cyclotriphosphazene, and
1,1-diamino-3,3,5,5-tetrakis(4-phenylphenoxy)cyclotriphosphazene.

Examples of the linear phosphazene derivatives represented by the general formula (II) for the flame-resistant fiber of the present invention include
1,1,3,3,5,5-hexa(methoxy)triphosphazene,
1,1,3,3,5,5-hexa(ethoxy)triphosphazene,
1,1,3,3,5,5-hexa(n-propoxy)triphosphazene,
1,1,3,3,5,5-hexa(iso-propoxy)triphosphazene,
1,1,3,3,5,5-hexa(n-butoxy)triphosphazene,
1,1,3,3,5,5-hexa(iso-butoxy)triphosphazene,
1,1,3,3,5,5-hexa(phenoxy)triphosphazene,
1,1,3,3,5,5-hexa(p-tolyloxy)triphosphazene,
1,1,3,3,5,5-hexa(m-tolyloxy)triphosphazene,
1,1,3,3,5,5-hexa(o-tolyloxy)triphosphazene,
1,1,3,3,5,5-hexa(p-anisyloxy)triphosphazene,
1,1,3,3,5,5-hexa(m-anisyloxy)triphosphazene,
1,1,3,3,5,5-hexa(o-anisyloxy)triphosphazene,
1,1,3,3,5,5-hexa(4-ethylphenoxy)triphosphazene,
1,1,3,3,5,5-hexa(4-n-propylphenoxy)triphosphazene,
1,1,3,3,5,5-hexa(4-iso-propylphenoxy)triphosphazene,
1,1,3,3,5,5-hexa(4-tert-butylphenoxy)triphosphazene,
1,1,3,3,5,5-hexa(4-tert-octylphenoxy)triphosphazene,
1,1,3,3,5,5-hexa(2,3-dimethylphenoxy)triphosphazene,
1,1,3,3,5,5-hexa(2,4-dimethylphenoxy)triphosphazene,
1,1,3,3,5,5-hexa(2,5-dimethylphenoxy)triphosphazene,
1,1,3,3,5,5-hexa(2,6-dimethylphenoxy)triphosphazene,
1,1,3,3,5,5-hexaaminotriphosphazene,
1,1,3,3,5,5-hexa(4-phenylphenoxy)triphosphazene,
1,3,5-tris(methoxy)-1,3,5-tris(phenoxy)triphosphazene,
1,3,5-tris(ethoxy)-1,3,5-tris(phenoxy)triphosphazene,
1,3,5-tris(n-propoxy)-1,3,5-tris(phenoxy)triphosphazene,
1,3,5-tris(iso-propoxy)-1,3,5-tris(phenoxy)triphosphazene,
1,3,5-tris(n-butoxy)-1,3,5-tris(phenoxy)triphosphazene,
1,3,5-tris(iso-butoxy)-1,3,5-tris(phenoxy)triphosphazene,
1,3,5-tris(methoxy)-1,3,5-tris(p-tolyloxy)triphosphazene,
1,3,5-tris(methoxy)-1,3,5-tris(m-tolyloxy)triphosphazene,
1,3,5-tris(methoxy)-1,3,5-tris(o-tolyloxy)triphosphazene,
1,3,5-tris(methoxy)-1,3,5-tris(p-anisyloxy)triphosphazene,
1,3,5-tris(methoxy)-1,3,5-tris(m-anisyloxy)triphosphazene,
1,3,5-tris(methoxy)-1,3,5-tris(o-anisyloxy)triphosphazene,
1,3,5-tris(ethoxy)-1,3,5-tris(p-tolyloxy)triphosphazene,
1,3,5-tris(ethoxy)-1,3,5-tris(m-tolyloxy)triphosphazene,
1,3,5-tris(ethoxy)-1,3,5-tris(o-tolyloxy)triphosphazene,
1,3,5-tris(ethoxy)-1,3,5-tris(p-anisyloxy)triphosphazene,
1,3,5-tris(ethoxy)-1,3,5-tris(m-anisyloxy)triphosphazene,
1,3,5-tris(ethoxy)-1,3,5-tris(o-anisyloxy)triphosphazene,
1,3,5-tris(n-propoxy)-1,3,5-tris(p-tolyloxy)triphosphazene,
1,3,5-tris(n-propoxy)-1,3,5-tris(m-tolyloxy)triphosphazene,
1,3,5-tris(n-propoxy)-1,3,5-tris(o-tolyloxy)triphosphazene,
1,3,5-tris(n-propoxy)-1,3,5-tris(p-anisyloxy)triphosphazene,
1,3,5-tris(n-propoxy)-1,3,5-tris(m-anisyloxy)triphosphazene,
1,3,5-tris(n-propoxy)-1,3,5-tris(o-anisyloxy)triphosphazene,
1,3,5-tris(iso-propoxy)-1,3,5-tris(p-tolyloxy)triphosphazene,
1,3,5-tris(n-butoxy)-1,3,5-tris(p-tolyloxy)triphosphazene,
1,3,5-tris(iso-butoxy)-1,3,5-tris(p-tolyloxy)triphosphazene,
1,3,5-tris(methoxy)-1,3,5-tris(4-tert-butylphenoxy)triphosphazene,
1,3,5-tris(methoxy)-1,3,5-tris(4-tert-octylphenoxy)triphosphazene,
1,3,5-tris(n-propoxy)-1,3,5-tris(4-tert-butylphenoxy)triphosphazene,
1,3,5-tris(n-propoxy)-1,3,5-tris(4-tert-octylphenoxy)triphosphazene,
1,3,5-tris(methoxy)-1,3,5-tris(4-phenylphenoxy)triphosphazene,
1,3,5-tris(ethoxy)-1,3,5-tris(4-phenylphenoxy)triphosphazene,
1,3,5-tris(n-propoxy)-1,3,5-tris(4-phenylphenoxy)triphosphazene,
1,3,5-tris(iso-propoxy)-1,3,5-tris(4-phenylphenoxy)triphosphazene,
1,3,5-tris(n-butoxy)-1,3,5-tris(4-phenylphenoxy)triphosphazene,
1,3,5-tris(iso-butoxy)-1,3,5-tris(4-phenylphenoxy)triphosphazene,
1,1-diamino-3,3,5,5-tetrakis(methoxy)triphosphazene,
1,1-diamino-3,3,5,5-tetrakis(ethoxy)triphosphazene,
1,1-diamino-3,3,5,5-tetrakis(n-propoxy)triphosphazene,
1,1-diamino-3,3,5,5-tetrakis(iso-propoxy)triphosphazene,
1,1-diamino-3,3,5,5-tetrakis(n-butoxy)triphosphazene,
1,1-diamino-3,3,5,5-tetrakis(iso-butoxy)triphosphazene,
1,1-diamino-3,3,5,5-tetrakis(phenoxy)triphosphazene,
1,1-diamino-3,3,5,5-tetrakis(p-tolyloxy)triphosphazene,
1,1-diamino-3,3,5,5-tetrakis(m-tolyloxy)triphosphazene,
1,1-diamino-3,3,5,5-tetrakis(o-tolyloxy)triphosphazene,
1,1-diamino-3,3,5,5-tetrakis(p-anisyloxy)triphosphazene,
1,1-diamino-3,3,5,5-tetrakis(m-anisyloxy)triphosphazene,
1,1-diamino-3,3,5,5-tetrakis(o-anisyloxy)triphosphazene, and
1,1-diamino-3,3,5,5-tetrakis(4-phenylphenoxy)triphosphazene.

For the flame-resistant fiber of the present invention, the cyclic phosphazene derivatives and the linear phosphazene derivatives described above are used as either singly or in combination of two or more. In both cases, the selection of cyclic phosphazene derivatives is preferred.

The hindered amine derivatives for the flame-resistant fiber of the present invention contain groups represented by the following general formula (III):

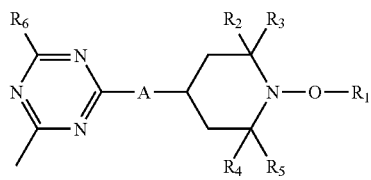
(III)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represent an alkyl group containing 1 to 4 carbon atoms or a pentamethylene group formed by linking $R_2$ and $R_3$ and/or $R_4$ and $R_5$; $R_6$ represents an alkoxy group containing 1 to 4 carbon atoms, an aryloxy group containing 6 to 12 carbon atoms, an amino group containing 1 to 18 carbon atoms, or a group represented by the general formula (IV) below; and A represents an oxygen atom or $NR_7$ where $R_7$ represents a hydrogen atom or a linear or branched alkyl group containing 1 to 12 carbon atoms:

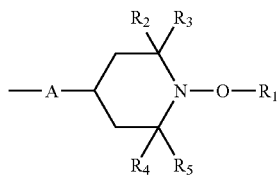
(IV)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represents an alkyl group containing 1 to 4 carbon atoms or a pentamethylene group formed by linking $R_2$ and $R_3$ and/or $R_4$ and $R_5$; and A represents an oxygen atom or $NR_7$ where $R_7$ represents a hydrogen atom or a linear or branched alkyl group containing 1 to 12 carbon atoms.

The hindered amine derivatives for the flame-resistant fiber of the present invention have a structure comprising weather-resistant hindered amine parts and flame-resistant sym-triazine parts. The hindered amine derivatives having the above-described structure show good affinity with the above-described phosphazene derivatives and thus, the combination of the hindered amine derivatives and the phosphazene derivatives reveals an excellent synergistic effect. Hindered amine derivatives possessing groups represented by the following general formula (V) are preferred, with groups represented by the general formula (VI) being further preferred:

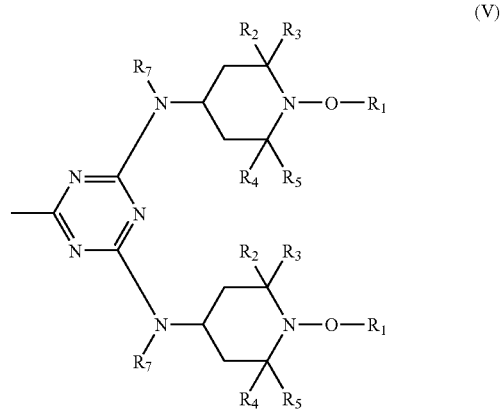
(V)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represents an alkyl group containing 1 to 4 carbon atoms or a pentamethylene group formed by linking $R_2$ and $R_3$ and/or $R_4$ and $R_5$; $R_7$ represents a hydrogen atom or a linear or branched alkyl group containing 1 to 12 carbon atoms:

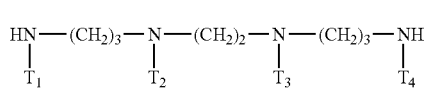
(VI)

where $T_1$, $T_2$, $T_3$, and $T_4$ independently represent a hydrogen atom or a group selected from those represented by the general formula (V).

Although the substituents $R_1$ may react with each other, the reaction products are allowed to exist.

$T_1$, $T_2$ and $T_3$ or $T_1$, $T_2$, and $T_4$ in the general formula (VI) preferred to be a group represented by the general formula (V). Preferred examples include N,N',N'''-tris{2,4-bis[(1-cyclohexyloxy-2,2,6,6-tetramethylpiperidine-4-yl)-n-butylamino]-sym-triazine-6-yl}-3,3'-ethylenediiminodipropylamine, N,N',N'''-tris{2,4-bis[(octyloxy-2,2,6,6-tetramethylpiperidine-4-yl)-n-butylamino]-sym-triazine-6-yl}-3,3'-ethylenediiminodipropylamine, and N,N',N'''-tris{2,4-bis[(1-methoxy-2,2,6,6-tetramethylpiperidine-4-yl)-n-butylamino]-sym-triazine-6-yl}-3,3'-ethylenediiminodipropylamine.

For the flame-resistant fiber of the present invention the hindered amine derivatives described above are used as either singly or in combination of two or more.

The flame-resistant fiber of the present invention contains 0.25-5.0 wt % or preferably 0.5-3.0 wt % of the above-described phosphazene derivatives and 0.025-3.0 wt % or preferably 0.05-2.0 wt % of the above-described hindered amine derivatives. When the added quantities of the phosphazene derivatives and the hindered amine derivatives (hereafter referred to as 'the flame-retardant components') are below these ranges, sufficient flame resistance cannot be imparted to the obtained fibers, while the added quantities of the flame-retardant components exceeding these ranges tend to decrease the flame resistance, contrary to expectation, and increase the manufacturing cost.

In addition, as the total addition of flame-retardant components increases, yarn breakage frequently occurs during spinning and the physical strength of the fiber decreases. Therefore, the total addition in the fiber is preferably in the range of 1 to 6 wt % and more preferably 1 to 4.5 wt %. When the added quantity lies within these ranges, good fiber drawability is achieved and no negative effects on the fiber properties are observed.

Any thermoplastic resin spinnable into fibers that are used as flame-resistant fibers of the present invention. Examples of these resins include polyesters, such as polyethylene terephthalate (PET) and polybutylene terephthalate (PBT), polyolefins, such as polyethylene (PE) and polypropylene (PP), polyarnides, such as nylon, polyurethanes, polystyrene, and acrylic resins. The thermoplastic resin may be a composition containing an elastomer resin as a main component, herein the main component is defined as the component with the highest content. The elastomer resin is a polymer material which at normal temperatures (20-30° C.) shows elasticity similar to vulcanized rubbers (due to a soft segment in the molecule) and which at high temperatures is moldable using a conventional fiber molding apparatus such as for normal thermoplastic resins (due to a hard segment in the molecule). Examples of the elastomer resins include polystyrene elastomers, polyolefin elastomers, polyester elastomers, polyarnide elastomers, and polyurethane elastomers.

Of the thermoplastic resins described above, polyolefins and polymers consisting of olefins as the main component are preferred because spinning can be conducted at relatively low temperatures to prevent the flame-retardant components from volatilizing and flame resistance is easily exhibited. In particular the flame-retardant components of the present invention are best suited to imparting flame resistance to the polyolefins since the components contain no or very little catalyst residues which would accelerate polyolefin degradation Preferred examples of the polyolefins include low-density polyethylene (LDPE), linear low-density polyethylene (L-LDPE), high-density polyethylene (HDPE), polypropylene (PP), ethylene-propylene copolymer, and ethylene-propylene-butene copolymer due to good availability and handling properties. Examples also include modified polyolefins (for example, maleic acid-modified copolymers) or copolymers with styrene or rubber monomers based on the above examples as a main component. The thermoplastic resins are used either individually or as in a mixture of two or more.

For the flame-resistant fiber of the present invention conventional additives may be compounded as long as the effects of the invention are not inhibited. Examples of these additives include antioxidants, light stabilizers, metal deactivators, UV absorbers, neutralizing agents, nucleating agents, lubricants, antibacterial agents, antistatic agents, pigments, plasticizers, and hydrophilic agents. Further, fillers, electrically conductive powders, and other flame-retardants may also be compounded as required.

No particular limitations are imposed on the manufacturing method for the flame-resistant fiber of the present invention. Any methods including a general spinning-stretching method, a spunbonding method, and a meltblowing method are applicable.

No particular limitations are imposed on the cross-section structure of the flame-resistant fiber of the present invention. The cross-section may have a composite structure comprising multiple thermoplastic resins with different melting points. In particular improved thermal fusibility in manufacturing the fiber moldings and, hence, retention of good physical strength of the fiber moldings are obtained for the flame-resistant fiber having a composite structure where the thermoplastic resin with a low melting point forms at least one part of the fiber surface continuously in the longitudinal direction. The composite cross-section structure may be of the type selected from sheath-core, side-by-side and radial geometry where the resins are arranged alternately and radially, and may also be as a hollow structure. Among these structures, the sheath-core type with a low-melting-point thermoplastic resin at the core or the side-by-side type with the low-melting-point thermoplastic resin on one side shows excellent thermal fusion of the fibers. Further, the fiber of the radial type structure with different types of thermoplastic resins arranged alternately and radially is formed into a separable flame-resistant fiber by selecting a combination of the thermoplastic resins with low compatibility.

When the flame-resistant fiber of the present invention is of a composite structure, the flame-retardant components may be contained only in either of the combined thermoplastic resins. Alternatively a combination of the thermoplastic resins with different ratio and content of the flame-retardant components may be employed. For example, for the flame-resistant fiber in a sheath-core structure, the above-described hindered amine derivatives, a weather-resistant component, may be compounded in the sheath and the above-described phosphazene derivatives, a flame-resistant component, may be compounded in the core. Nevertheless, it is preferred that the flame-retardant components are compounded only in the core to inhibit the components from bleeding out of the fiber.

Although no particular limitations are imposed on the fineness of the flame-resistant fiber of the present invention, the fiber with fineness 0.01-100 dtex or preferably 0.05-50 dtex shows good drawability in spinning processes and results in fiber materials with good uniformity.

The flame-resistant fiber of the present invention may be a fiber that is crimped and cut into a certain length after spinning and drawing or that where the fiber is a tow without cutting after spinning and drawing.

When the flame-resistant fiber of the invention is of the former, no particular limitations are imposed on the fiber length, which is correctly selected according to the uses of the fiber. However, a preferred fiber length is 2 mm or longer to impart sufficient tensile strength to the fiber moldings which are manufactured by thermally fusing the fibers with each other. When the flame-resistant fiber is processed by a carding method, the fiber with length 20-76 mm generally provides a web with high uniformity, although a preferred fiber length depends on the fiber fineness. When the flame-resistant fiber is processed by a paper-making method or an airlaid method, a preferred fiber length is generally in the range of 2 to 20 mm.

A surfactant may be applied to the surface of the flame-resistant fiber of the present invention to impart various properties, such as anti-static, opening, and smoothness. Examples of surfactant application methods include the roller, immersion and pad-drying method. In applying the surfactant, a surfactant type and its concentration should be properly selected according to the uses of the fiber. The surfactant may be applied at any stage in the fiber manufacturing process from spinning, drawing, and crimping. The surfactant may be applied on the surface of the fiber molding as required.

The fiber molding of the present invention may be in any form as long as the flame-resistant fiber of the invention is used. For example, the fiber molding may only comprise the flame-resistant fiber of the invention in a form of a woven fabric, a knitted fabric, a nonwoven fabric, and a filter. Alternatively, the fiber molding in the form of a woven fabric, a knitted fabric, a nonwoven fabric, and a filter may comprise the flame-resistant fiber of the invention and, as required, other fibers mixed by fiber blending, mix spinning, or fabric blending as long as the effects of the invention are not significantly interfered.

The fiber molding of the present invention is manufactured by any known method in the public domain. Examples include a method which comprises cutting the flame-resistant fiber of the present invention to a certain length, forming a fiber assembly (web) by a dry method, such as a carding method, or a wet method, such as a paper-making method, and forming a nonwoven fabric by compression adhesion using a heated roller or supersonic wave radiation, fusion by heated air, or fiber intertwining by high-pressure water flow or needle, a method which comprises cutting the flame-resistant fiber into a certain length, laminating the cut fibers by an airlaid method, and heating by a heated roller or heated air to obtain a nonwoven fabric, a method which comprises heating slivers obtained by a carding method from the flame-resistant fiber of the invention cut into a certain length to provide the fiber molding, and a method which comprises knitting spun yarns or continuous yarns of the flame-resistant fiber of the invention to obtain a knitted fabric. Because the flame-resistant fiber of the invention contains the flame-retardant components inside, the amount of the flame-retardant components removed from the fiber during the carding method or high-pressure-water treatment is much lower than that of the other flame-resistant fibers having flame-retardants applied only on the surface by immersion in an agent solution.

In addition, the fiber molding may be manufactured by a spunbonding method or a meltblown method, or by heat treatment of a long fiber tow without cutting using a heated roller or heated air.

Examples of the above-described other fibers include synthetic fibers, such as polyamides, polyesters, polyolefins, and acrylic polymers, natural fibers, such as cotton, wool, and hemp, regenerated fibers and semi-synthetic fibers, such as rayon, cupra, and acetate, biodegradable fibers, such as polylactic acid fibers and polybutylene succinate fibers, pulp, glass fibers, and carbon fibers.

The flame-resistant fiber and the fiber molding of the present invention are particularly useful for automobile interiors, house interior materials, such as wallpapers and carpets, air filters, filtration materials, and clothing due to its excellent flame resistance and weather resistance.

EXAMPLES

The present invention is described below with reference to examples and comparative examples. Here in the description below, one of the modes for employing the invention, a staple fiber, will be used to investigate the effects of the flame-resistant fiber of the invention. However, the invention is not limited to staple fibers since the other modes are easily employed by reference to the examples. The terms and the evaluation method used in the examples and comparable examples are as follows.

(a) Melt mass flow rate (MFR): measured in accordance with Operation B (Automatic time measuring method) described in JIS K 7210, Method for thermoplastic resin flow test. High-density polyethylene was measured under test condition D (temperature: 190° C., load: 2.16 kg), and polypropylene was measured under test condition M (temperature: 230° C., load: 2.16 kg).

(b) Melting point: measured with a differential scanning calorimeter, DSC Q 10 (trade name; manufactured by TA Instruments Inc.) in accordance with JIS K 7122.

(c) Fiber fineness: measured in accordance with method A of the corrected fineness measurement method described in JIS L 1015, Method for measuring chemical fiber staples.

(d) Tensile strength and elongation of fiber: measured in accordance with JIS L 1015, Method for measuring chemical fiber staples.

(e) Flame resistance evaluation:

Measurement of after flame time and carbonized area

The nonwoven fabrics with a basis weight (weight per unit area) of 200 g/m² prepared in Example 1 to 8 and Comparative Example 1 to 8 were used as test samples. After flame time (second) and carbonized area (cm²) were measured for the fabric samples in accordance with method A-1 in JIS L 1901 and the flame resistance was evaluated based on the results. Lower values indicate better flame resistance for both after flame time and carbonized area.

Evaluation

Based on the results obtained by measurements of after flame time and carbonized area, the flame resistance of each of the nonwoven fabric samples was evaluated using the following grading marks; ⊚: very good, ○: good, Δ: possessing flame resistance but not good, ✗: possessing no or very little flame resistance.

(f) Weather resistance evaluation

Measurement of nonwoven fabric strength

The nonwoven fabrics with a basis weight of 60 g/m² prepared in Example 1 to 8 and Comparative Example 1 to 8 were cut into strips with width 2.5 cm and length 15 cm to prepare test samples. The sample was stretched at a rate of 100 mm/min by an Autograph AGS500D (trade name; manufactured by Shimadzu Corporation) at room temperature until the sample failed. The tensile strength at break was measured and converted into a value for a basis weight of 60 g/m² using the formula below to obtain the nonwoven fabric strength (N/2.5 cm).

Nonwoven fabric strength=(Tensile strength)×60/
(Basis weight of each nonwoven fabric sample)

Measurement of retention of nonwoven fabric strength

The nonwoven fabrics with a basis weight of 60 g/m² prepared in Example 1 to 8 and Comparative Example 1 to 8 were used for test samples. The nonwoven fabric strength for each sample was measured in accordance with the above-described nonwoven fabric strength measurement method after UV irradiation for 40, 80, 120, 160, and 200 hours using a light-resistance tester by UV-type carbon arc described in JIS B 7751 and the retention of the nonwoven fabric strength (%) was obtained as a percentage of the nonwoven fabric strength before irradiation. A value close to 100 indicated that degradation of the nonwoven fabric was prevented, meaning that the fabric possessed good weather resistance.

Evaluation

Based on the results of the retained nonwoven fabric strength, the weather resistance of each of the nonwoven fabric samples was evaluated using the following grading marks; ⊚: very good, ○: good, Δ: possessing weather resistance but not good, ✗: possessing no or very little weather resistance.

HDPE: high-density polyethylene, melting point 130° C., MFR 15 (190° C.)

PP: polypropylene, melting point 165° C., MFR 10 (230° C.)
co-PP: ethylene-propylene-butene copolymer, melting point 135° C., MFR 15 (230° C.)
Flame-retardant A: a cyclic phosphazene flame-retardant, KEMIDANT 302S [trade name; 1,1,3,3,5,5-hexa(aryloxy)cyclotriphosphazene; manufactured by Chemipro Kasei Kaisha, Ltd.]
Flame-retardant B: a hindered amine flame-retardant, FLAMESTAB NOR 116 [trade name; a compound represented by the general formula (VI); manufactured by Ciba Specialty Chemicals Inc.]
Flame-retardant C: antimony trioxide
Flame-retardant D: a halogen-containing flame-retardant, GLC DE-83R (trade name; manufactured by Great Lakes Chemical Japan Ltd.)
Additive E: a phosphorus-containing antioxidant, IRGAFOS 168 (trade name; manufactured by Ciba Specialty Chemicals Inc.)
Flame-retardant F: a phosphoric acid ester flame-retardant, FP-500 (trade name, manufactured by Asahi Denka Co., Ltd.)

Example 1

A side-by-side composite fiber was manufactured by using a composite spinning apparatus equipped with two extruders equipped with a die for spinning side-by-side fibers.

The 1st component for one of the sides comprising PP 98.4 wt %, the flame-retardant A 1.5 wt %, and the flame-retardant B 0.1 wt % and the 2nd component for the other side comprising HDPE 98.4 wt %, the flame-retardant A 1.5 wt %, and the flame-retardant B 0.1 wt % were fed into each hopper of the two extruders, spun at 250° C. in such a way that the obtained composite fiber had a side-by-side cross-section with the volume ratio of the 1st component to the 2nd of 50/50, and collected on a winder. In the winding process, an alkyl phosphate potassium salt surfactant was applied onto the spun composite fiber surface. Then the composite fiber (non-stretched yarn) collected on the winder was stretched 4.5-fold at 100° C. with a stretching apparatus, mechanically crimped upon passing through a stuffing box, and cut into 51-mm lengths to obtain a crimped fiber (staple fiber) with fineness 3.3 dtex. Tensile strength and elongation of the fiber were measured and the results are shown in Table 1.

The staple fiber was then carded into a web with a carding apparatus and the web was heated at 130° C. for 12 seconds with an air-through dryer to give a nonwoven fabric (fiber molding) in which intersections of the composite fibers were thermally fused. Flame resistance and weather resistance of the obtained nonwoven fabric were evaluated and the results are shown in Table 1. The nonwoven fabric sample for the flame resistance evaluation was prepared by adjusting a basis weight at 200 g/m² and that for the weather resistance evaluation was prepared by adjusting a basis weight at 60 g/m².

Example 2 to 5

Composite fibers and nonwoven fabrics were prepared by the same method as in Example 1, except that the fibers comprised the compositions shown in Table 1. Tensile strength and elongation of the fibers were measured and the evaluations of flame resistance and weather resistance were conducted. The results are shown in Table 1.

Example 6

A composite fiber and a nonwoven fabric were prepared by the same method as in Example 1, except that the fiber comprised the composition shown in Table 1 and that a composite spinning apparatus equipped with two extruders with a die for spinning sheath-core composite fibers was used to prepare a sheath-core fiber. Tensile strength and elongation of the fiber were measured and the evaluations of flame resistance and weather resistance were conducted. The results are shown in Table 1.

Example 7

A sheath-core composite fiber was prepared by the same method as in Example 1, except that the fiber comprised the composition shown in Table 1 and that the fiber was spun at 280° C. with a composite spinning apparatus equipped with two extruders with a die for spinning sheath-core composite fibers and drawn 3.0-fold at 110° C. A nonwoven fabric was prepared by the same method as in Example 1, except that a web was heated at 140° C. Tensile strength and elongation of the fiber were measured and the evaluations of flame resistance and weather resistance were conducted. The results are shown in Table 1.

Example 8

A composite fiber and a nonwoven fabric were prepared by the same method as in Example 1, except that the fiber comprised the composition shown in Table 1 and that a die for spinning side-by-side composite fibers with a nozzle diameter larger than that in Example 1 was used to produce a fiber of fineness 15.6 dtex. Tensile strength and elongation of the fiber were measured and the evaluations of flame resistance and weather resistance were conducted. The results are shown in Table 1.

Comparative Example 1 to 6

Composite fibers and nonwoven fabrics were prepared by the same method as in Example 1, except that the fibers comprised the compositions shown in Table 2. Tensile strength and elongation of the fibers were measured and the evaluations of the flame resistance and weather resistance were conducted. The results are shown in Table 2.

Comparative Example 7

A composite fiber and a nonwoven fabric were prepared by the same method as in Example 1, except that the fiber comprised the composition shown in Table 2 and that a composite spinning apparatus equipped with two extruders with a die for spinning sheath-core composite fibers was used to prepare a sheath-core fiber. Tensile strength and elongation of the fiber were measured and the evaluations of flame resistance and weather resistance were conducted. The results are shown in Table 2

Comparative Example 8

A sheath-core composite fiber was prepared by the same method as in Example 1, except that the fiber comprised the composition shown in Table 2 and that the fiber was spun at 280° C. with a composite spinning apparatus equipped with two extruders with a die for spinning sheath-core composite fibers and drawn 3.0-fold at 110° C. A nonwoven fabric was prepared by the same method as in Example 1, except that a web was heated at 140° C. Tensile strength and elongation of the fiber were measured and the evaluations of flame resistance and weather resistance were conducted. The results are shown in Table 2

Comparative Example 9

Spinning of a composite fiber was tested by the same method as in Example 1, except that the fiber comprised the composition shown in Table 2 and that a die for spinning side-by-side composite fibers with a nozzle diameter larger than that in Example 1 was used to produce a fiber of fineness 15.6 dtex. However yarn breakage frequently occurred and a fiber could not be prepared.

As shown in Table 1, it is clear that the flame-resistant fibers of the present invention of Examples 1 to 8 possessed excellent flame resistance and weather resistance.

On the other hand, Table 2 clearly shows that the fiber of Comparative Example 1 containing no flame-retardants possessed very low flame resistance and weather resistance and that the fibers of Comparative Examples 2 and 3 with the content of either the phosphazene derivatives or the hindered amine derivatives, the essential components of the flame-resistant fiber of the present invention, being out of the range of the invention displayed insufficient flame resistance.

In addition, it is clear from Table 2 that the fibers of Comparative Examples 4 to 8 containing flame-retardants different from those for the flame-resistant fiber of the present invention displayed a poor balance of flame and weather resistance. In Comparative Example 4, in particular, because the flame-retardant composition of the combination of antimony trioxide and the halogen-containing flame-retardant was compounded, the fiber possessed good flame resistance but very poor weather resistance due to accelerated degradation of the polyolefin. In Comparative Examples 5 to 8, although the hindered amine derivative, one of the essential components of the invention, was used, the phosphoric acid ester flame-retardant or the phosphorus-containing antioxidant was used together instead of the phosphazene derivatives, the other essential component of the invention, which led to good weather resistance but insufficient flame resistance.

Further, in Comparative Example 9, because the flame-retardant components for the flame-resistant fiber of the present invention were compounded with the amount exceeding the range of the invention, fiber breakage frequently occurred during spinning and a fiber was not obtained due to extremely low processability.

Effect of the Invention

The flame-resistant fiber and the fiber molding using the same of the present invention highly suppresses emission of substances hazardous to humans and the environment occurring in the manufacturing processes, in the event of fire, and in combustion disposal. Furthermore, because the hindered amine derivatives with the specific structures and the phosphazene derivatives with the specific structures, the flame-retardant components for the flame-resistant fiber of the present invention, possess good compatibility with each other, and establish excellent flame resistance at low addition quantities due to their synergistic effect. Good productivity, low cost, and significantly lower physical strength reduction of the fiber are also achieved. In addition, the excellent weather resistance helps to retain good physical strength over time.

As shown above, the flame-resistant fiber and the fiber molding using the same of the present invention are, in addition to the high flame resistance, low in negative effects on the environment and durable and thus, are useful in a wide-range of products including automobile interiors, housing interior materials, and filter materials.

TABLE 1

| | | | Examples | | | | | | | |
|---|---|---|---|---|---|---|---|---|---|---|
| | | | 1 | 2 | 3 | 4 | 5 | 6 | 7 | 8 |
| Fiber composition | Fiber cross-section | | Side-by-side | Side-by-side | Side-by-side | Side-by-side | Side-by-side | Sheath-core | Sheath-core | Side-by-side |
| | 1st component | Resin | PP | PP | PP | PP | PP | PP | PP | PP |
| | | Flame-retardant: Added amount (wt %) | A: 1.5 B: 0.1 | A: 1.5 B: 0.5 | A: 0.5 B: 1.0 | A: 1.0 B: 2.0 | — | A: 1.5 B: 0.5 | A: 1.5 B: 0.5 | A: 1.5 B: 0.5 |
| | 2nd component | Resin | HDPE | HDPE | HDPE | HDPE | HDPE | HDPE | co-PP | HDPE |
| | | Flame-retardant: Added amount (wt %) | A: 1.5 B: 0.1 | A: 1.5 B: 0.5 | A: 0.5 B: 1.0 | — | A: 1.0 B: 2.0 | A: 1.5 B: 0.5 | A: 1.5 B: 0.5 | A: 1.5 B: 0.5 |
| | Flame-retardant contained in fiber: Total added amount (wt %) | | A: 1.5 B: 0.1 | A: 1.5 B: 0.5 | A: 0.5 B: 1.0 | A: 0.5 B: 1.0 | A: 0.5 B: 1.0 | A: 1.5 B: 0.5 | A: 1.5 B: 0.5 | A: 1.5 B: 0.5 |
| Fineness (dtex) | | | 3.3 | 3.3 | 3.3 | 3.3 | 3.3 | 3.3 | 3.3 | 15.6 |
| Fiber tensile strength (cN/dtex) | | | 3.25 | 3.34 | 3.07 | 3.32 | 3.10 | 3.23 | 2.30 | 2.52 |
| Fiber elongation (%) | | | 47 | 49 | 48 | 49 | 45 | 53 | 173 | 130 |
| Flame resistance | After flame time | (s) | 9.4 | 8.1 | 12.0 | 11.6 | 12.1 | 7.8 | 12.3 | 7.0 |
| | Carbonized area | (cm$^2$) | 16.6 | 12.6 | 17.0 | 18.6 | 17.5 | 11.9 | 16.2 | 12.8 |
| | Evaluation | | ○ | ⊚ | ○ | ○ | ○ | ⊚ | ○ | ⊚ |
| Weather resistance | Initial nonwoven fabric strength (N/2.5 cm) | | 90.3 | 88.7 | 72.4 | 84.6 | 90.0 | 95.1 | 80.4 | 91.7 |
| | After weather resistance test | | | | | | | | | |
| | Nonwoven fabric strength retention (%) | for 40 hours | 100.0 | 100.0 | 100.0 | 100.0 | 98.6 | 100.0 | 99.9 | 99.9 |
| | | for 80 hours | 96.9 | 96.9 | 95.5 | 99.8 | 93.4 | 98.1 | 98.0 | 95.5 |
| | | for 120 hours | 95.9 | 96.4 | 95.5 | 96.8 | 89.7 | 97.0 | 95.9 | 95.3 |
| | | for 160 hours | 88.7 | 90.8 | 85.3 | 83.6 | 85.0 | 92.4 | 90.1 | 94.4 |
| | | for 200 hours | 79.9 | 86.7 | 83.1 | 78.7 | 81.8 | 90.0 | 85.5 | 90.6 |
| | Evaluation | | ○ | ⊚ | ⊚ | ○ | ⊚ | ⊚ | ⊚ | ⊚ |

TABLE 2

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Fiber composition | Fiber cross-section | | Side-by-side | Side-by-side | Side-by-side | Side-by-side | Side-by-side | Side-by-side | Sheath-core | Sheath-core | Side-by-side |
| | 1st component | Resin | PP | PP | PP | PP | PP | PP | PP | PP | PP |
| | | Flame-retardant: Added amount (wt %) | — | A: 2.0 B: 0.02 | A: 0.2 B: 2.0 | C: 2.0 D: 5.0 | B: 2.0 E: 0.32 | B: 1.5 F: 1.0 | B: 2.0 E: 0.32 | B: 1.5 F: 1.0 | A: 5.5 B: 3.5 |
| | 2nd component | Resin | HDPE | HDPE | HDPE | HDPE | HDPE | HDPE | HDPE | co-PP | HDPE |
| | | Flame-retardant: Added amount (wt %) | — | A: 2.0 B: 0.02 | A: 0.2 B: 2.0 | C: 2.0 D: 5.0 | B: 1.0 E: 0.2 | — | B: 1.0 E: 0.2 | — | A: 5.5 B: 3.5 |
| | Flame-retardant contained in fiber: Total added amount (wt %) | | — | A: 2.0 B: 0.02 | A: 0.2 B: 2.0 | C: 2.0 D: 5.0 | B: 1.5 E: 0.26 | B: 0.75 F: 0.5 | B: 1.5 E: 0.26 | B: 0.75 F: 0.5 | A: 5.5 B: 3.5 |
| Fineness (dtex) | | | 3.3 | 3.3 | 3.3 | 3.3 | 3.3 | 3.3 | 3.3 | 3.3 | Fiber not obtained |
| Fiber tensile strength (cN/dtex) | | | 3.23 | 3.12 | 2.75 | 2.84 | 3.21 | 3.15 | 3.14 | 2.88 | |
| Fiber elongation (%) | | | 52 | 49 | 40 | 46 | 46 | 48 | 50 | 93 | |
| Flame resistance | After flame time | (s) | 64.0 | 16.0 | 24.1 | 8.0 | 18.8 | 20.0 | 18.6 | 65.7 | — |
| | Carbonized area | (m$^2$) | 95.2 | 25.0 | 36.5 | 13.0 | 21.8 | 29.6 | 24.7 | 98.1 | |
| | Evaluation | | X | Δ | Δ | ⊙ | Δ | Δ | Δ | X | — |
| Weather resistance | Initial nonwoven fabric strength (N/2.5 cm) | | 91.0 | 91.9 | 80.1 | 52.0 | 90.2 | 70.6 | 93.4 | 74.8 | — |
| | | After weather resistance test | | | | | | | | | |
| | Nonwoven fabric strength retention (%) | for 40 hours | 98.3 | 99.4 | 100.0 | 24.0 | 99.7 | 99.8 | 100.0 | 98.9 | — |
| | | for 80 hours | 44.9 | 90.1 | 100.0 | 6.3 | 93.9 | 92.4 | 99.1 | 90.1 | — |
| | | for 120 hours | 20.1 | 78.3 | 99.7 | 2.5 | 89.1 | 83.0 | 96.4 | 81.9 | — |
| | | for 160 hours | 12.1 | 68.8 | 99.6 | +TC — | 87.0 | 78.6 | 92.4 | 76.8 | — |
| | | for 200 hours | +TC — | 56.3 | 99.6 | +TC — | 85.8 | 74.7 | 89.5 | 70.7 | — |
| | Evaluation | | Δ | Δ | ⊙ | X | ⊙ | ○ | ⊙ | ○ | — |

What is claimed is:

1. A flame-resistant fiber comprising at least one type of phosphazene derivative selected from cyclic phosphazene derivatives represented by the following general formula (I) and linear phosphazene derivatives represented by the following general formula (II), a hindered amine derivative containing groups represented by the following general formula (VI), and a thermoplastic resin comprising polyolefin, wherein the fiber contains a total amount of flame-retardant components in a range of 1 to 6 wt % consisting of 0.25-5.0 wt % of the phosphazene derivative and 0.025-3.0 wt % of the hindered amine derivative and the fiber fineness is 0.01-100 dtex:

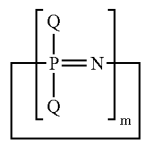

(I)

where m represents an integer from 3 to 10 and each of Qs represents a group independently selected from alkoxy, aryloxy, and amino:

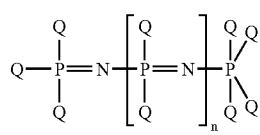

(II)

where n represents an integer from 3 to 10 and each of Qs represents a group independently selected from alkoxy, aryloxy, and amino:

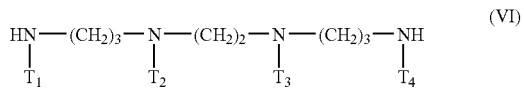

(VI)

where at least one of $T_1$, $T_2$, $T_3$, and $T_4$ independently represents a group selected from those represented by the general formula (V) and a remaining of $T_1$, $T_2$, $T_3$, and $T_4$ independently represents a hydrogen atom:

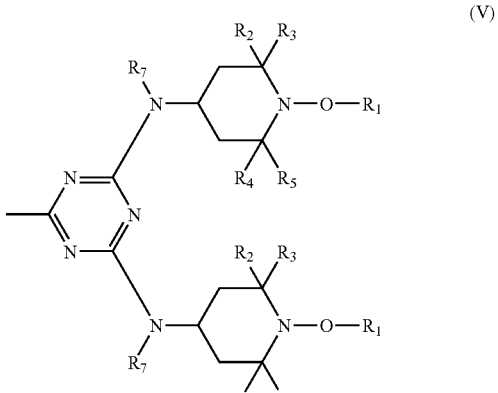

(V)

where $R_1$ represents an alkyl group containing 1 to 18 carbon atoms, a cycloalkyl group containing 5 to 12 carbon atoms, a bicyclic or tricyclic hydrocarbon group containing 7 to 18 carbon atoms, or a phenylalkyl group containing 7 to 15 carbon atoms; each of $R_2$, $R_3$, $R_4$, and $R_5$ independently represents an alkyl group containing 1 to 4 carbon atoms or a pentamethylene group formed by linking $R_2$ and $R_3$ and/or $R_4$ and $R_5$; $R_7$ represents a hydrogen atom or a linear or branched alkyl group containing 1 to 12 carbon atoms.

2. A flame-resistant fiber according to claim 1, wherein the fiber is a composite fiber.

3. A fiber molding product made by the fiber described in claim 1.

4. A fiber molding product made by the fiber described in claim 2.

* * * * *